Figure 1:
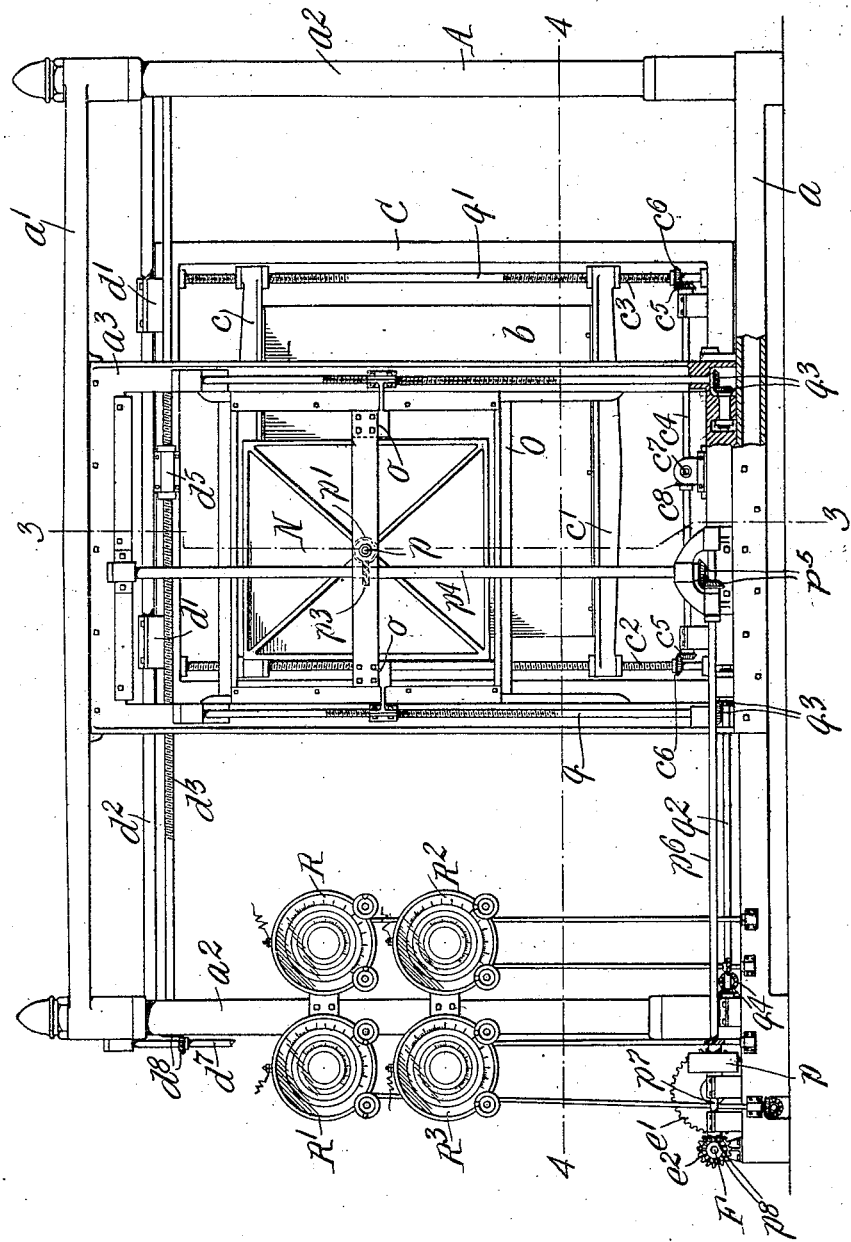

W. C. HUEBNER.
MACHINE FOR MAKING ELECTROTYPE MATRICES.
APPLICATION FILED APR. 7, 1911.

1,057,737.

Patented Apr. 1, 1913.
13 SHEETS—SHEET 1.

Witnesses:
C. C. Easterbrooks.
A. G. Dimond.

Inventor:
William C. Huebner,
Wilhelm Parker Ward,
Attorneys

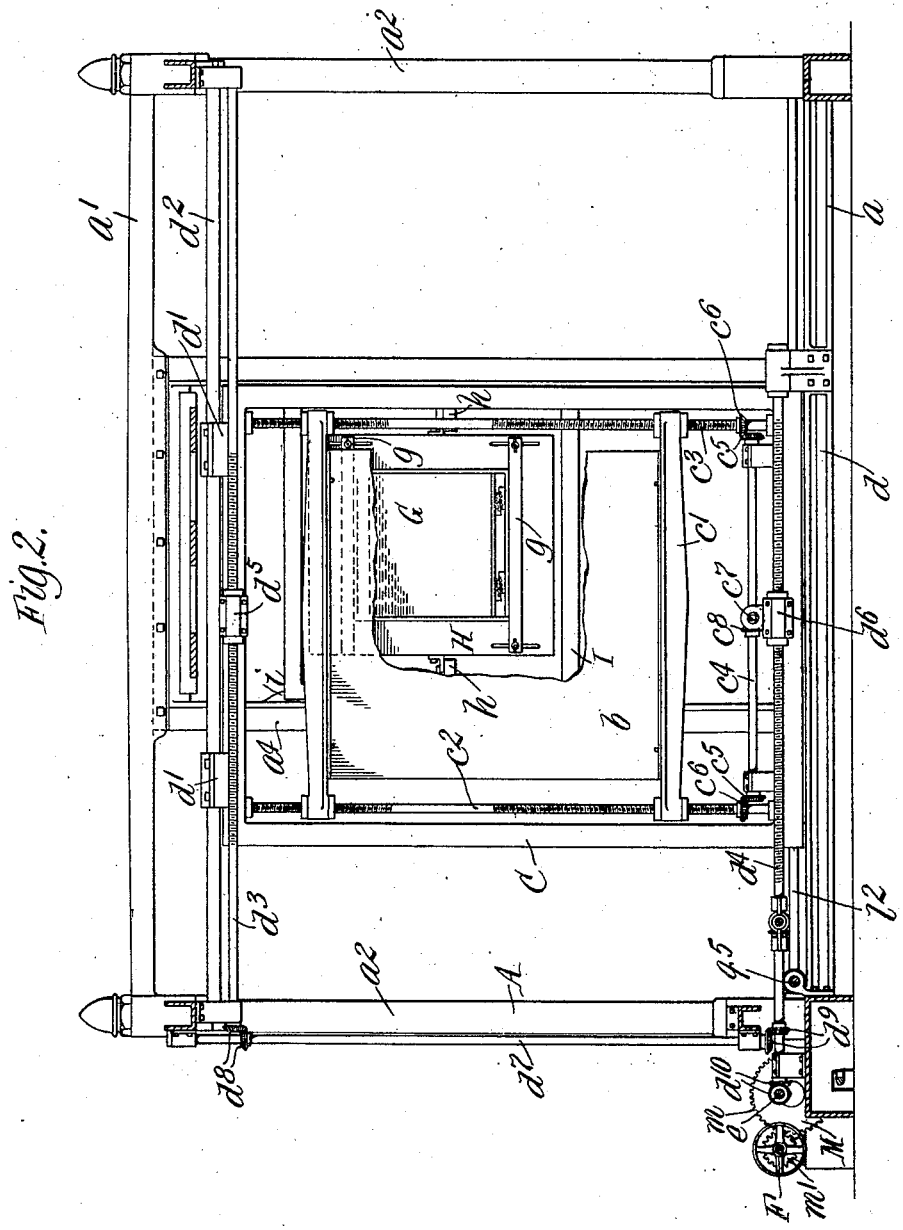

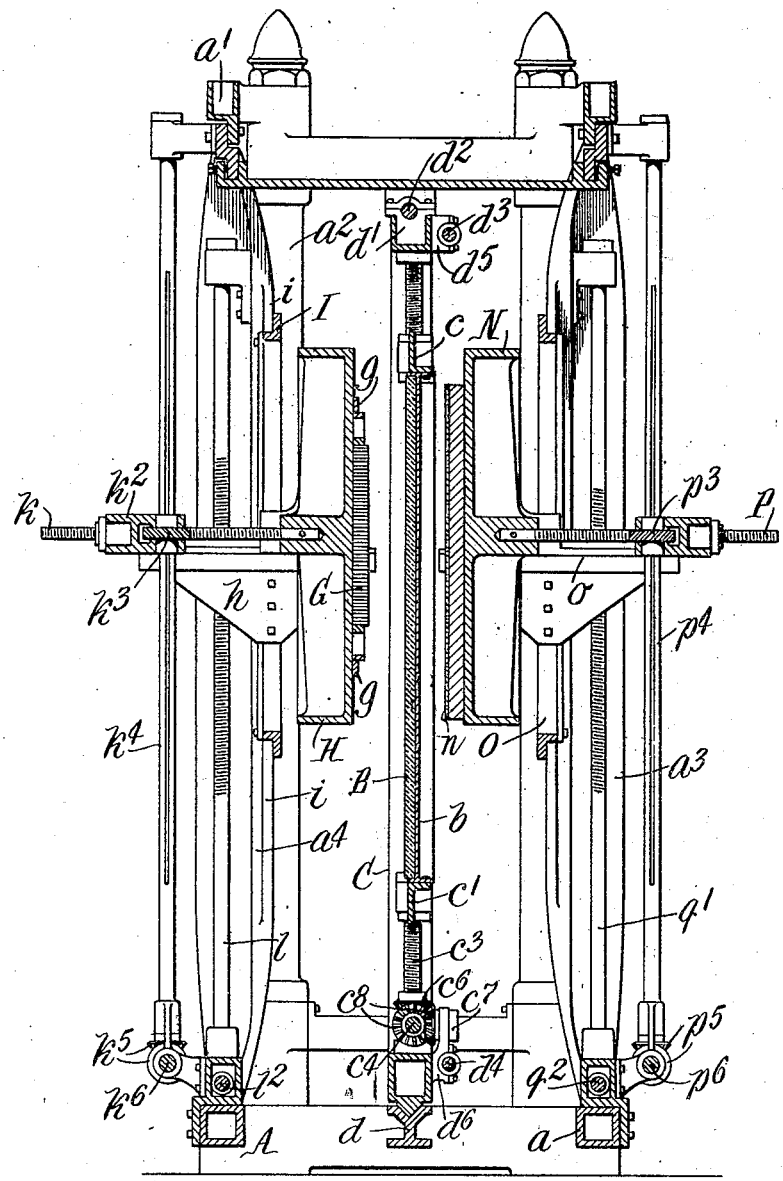

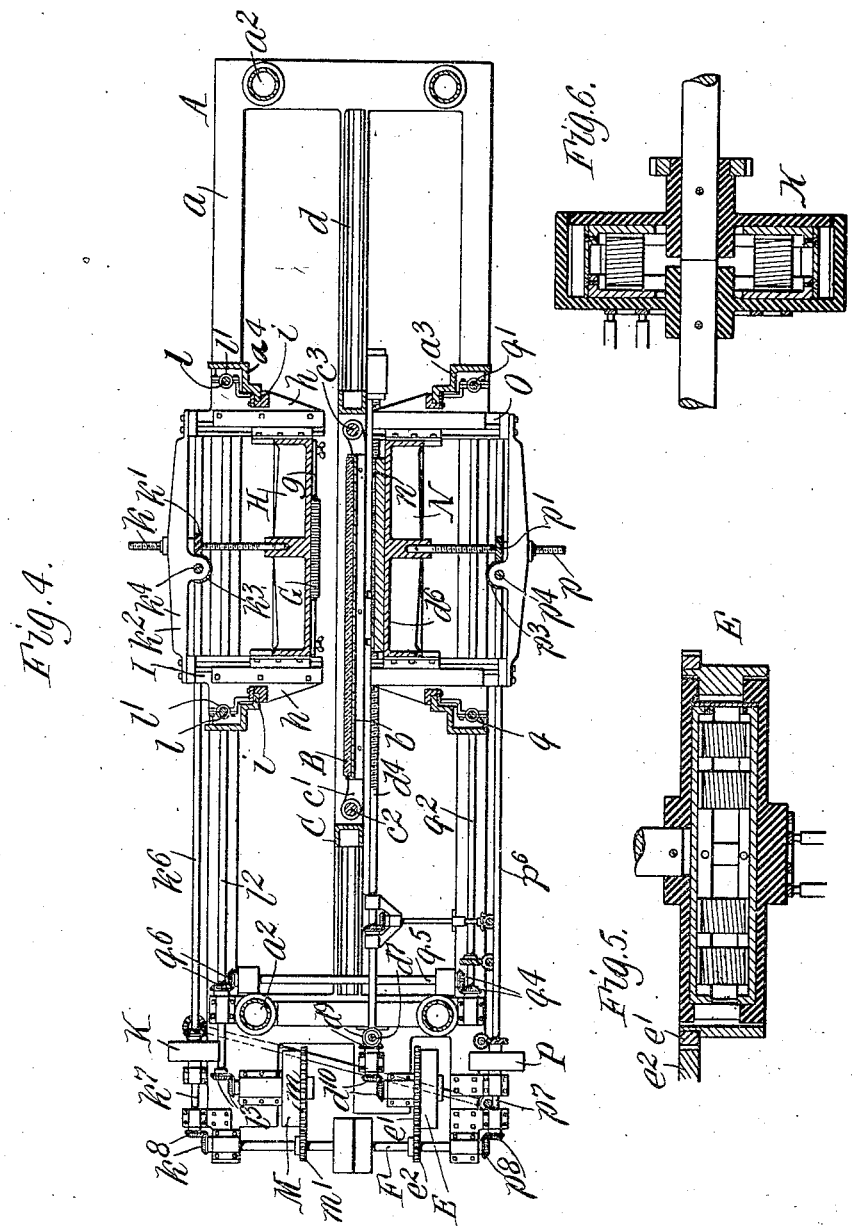

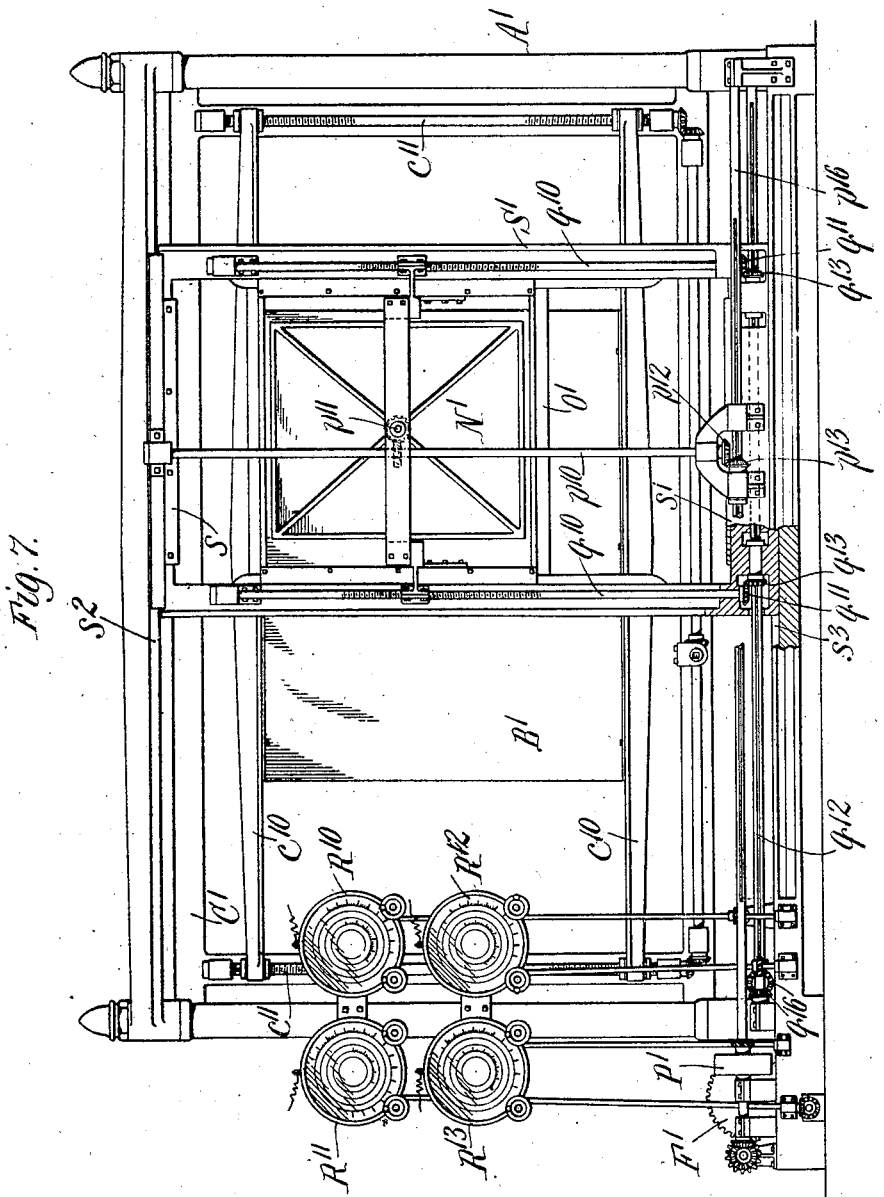

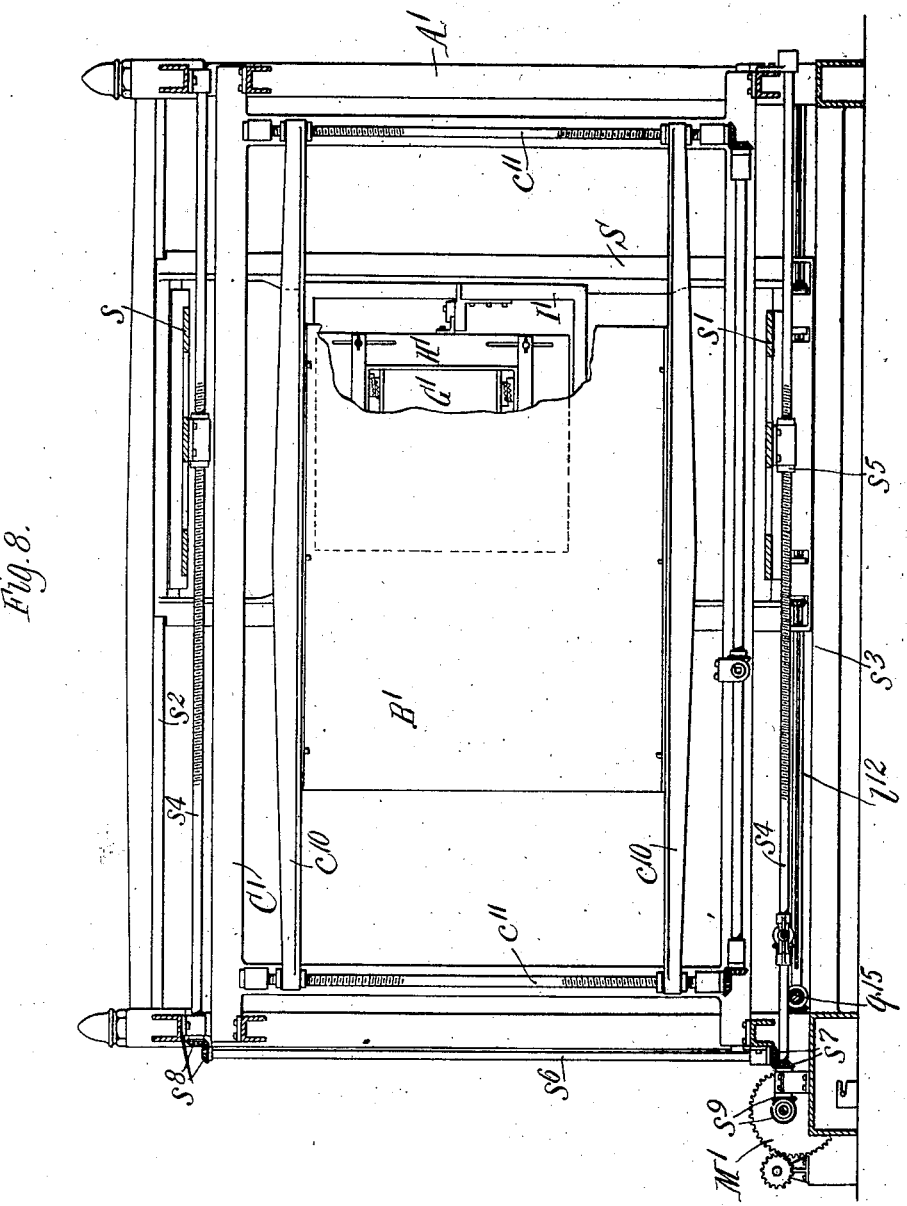

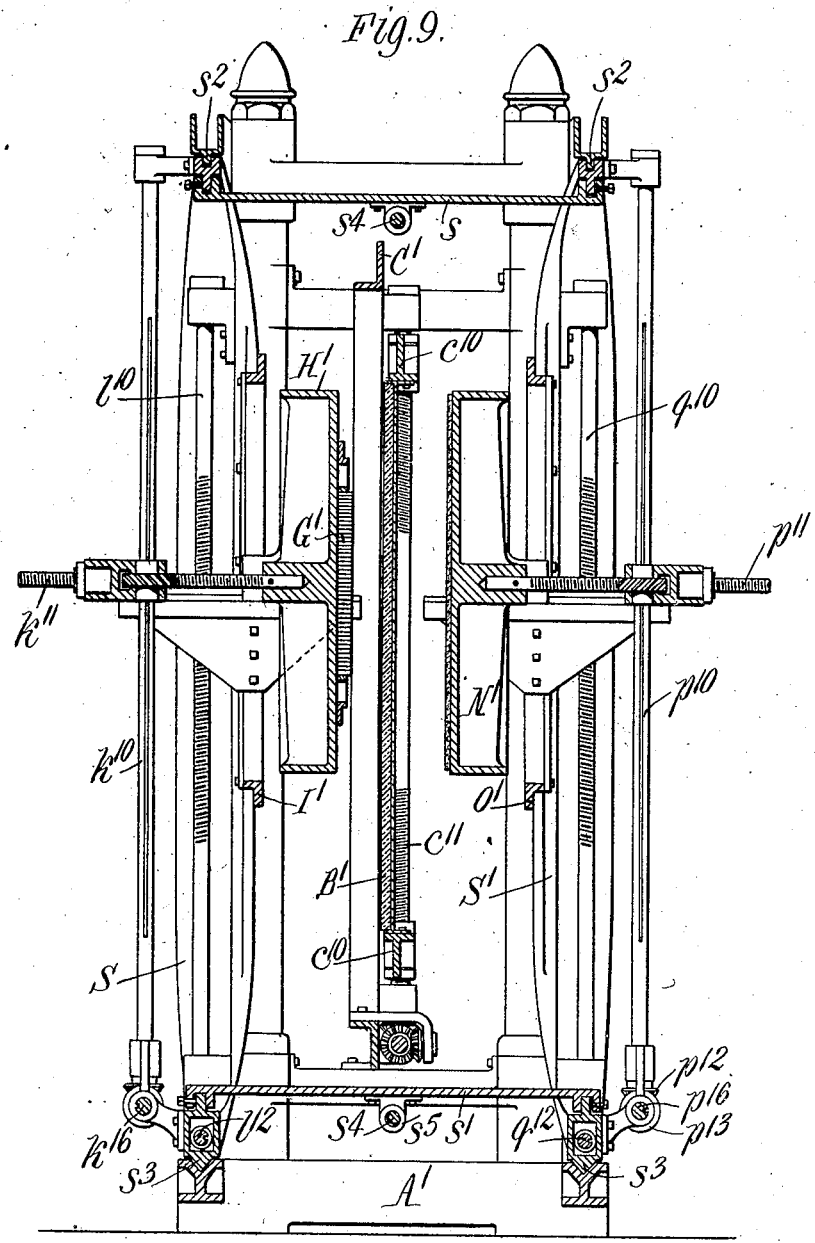

W. C. HUEBNER.
MACHINE FOR MAKING ELECTROTYPE MATRICES.
APPLICATION FILED APR. 7, 1911.
1,057,737.
Patented Apr. 1, 1913.
13 SHEETS—SHEET 8.
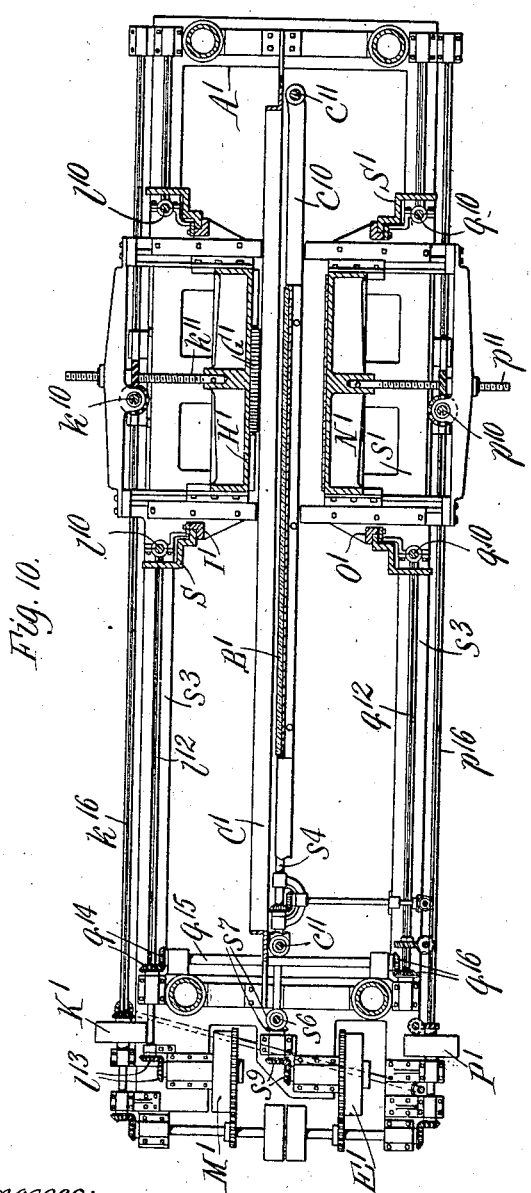
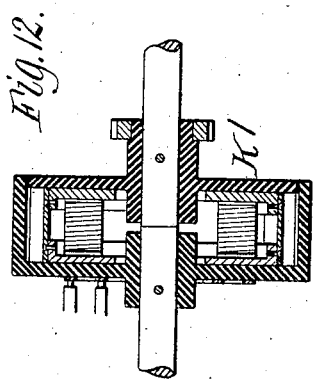
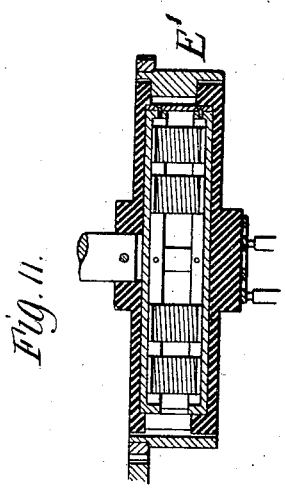
Witnesses:
Inventor.

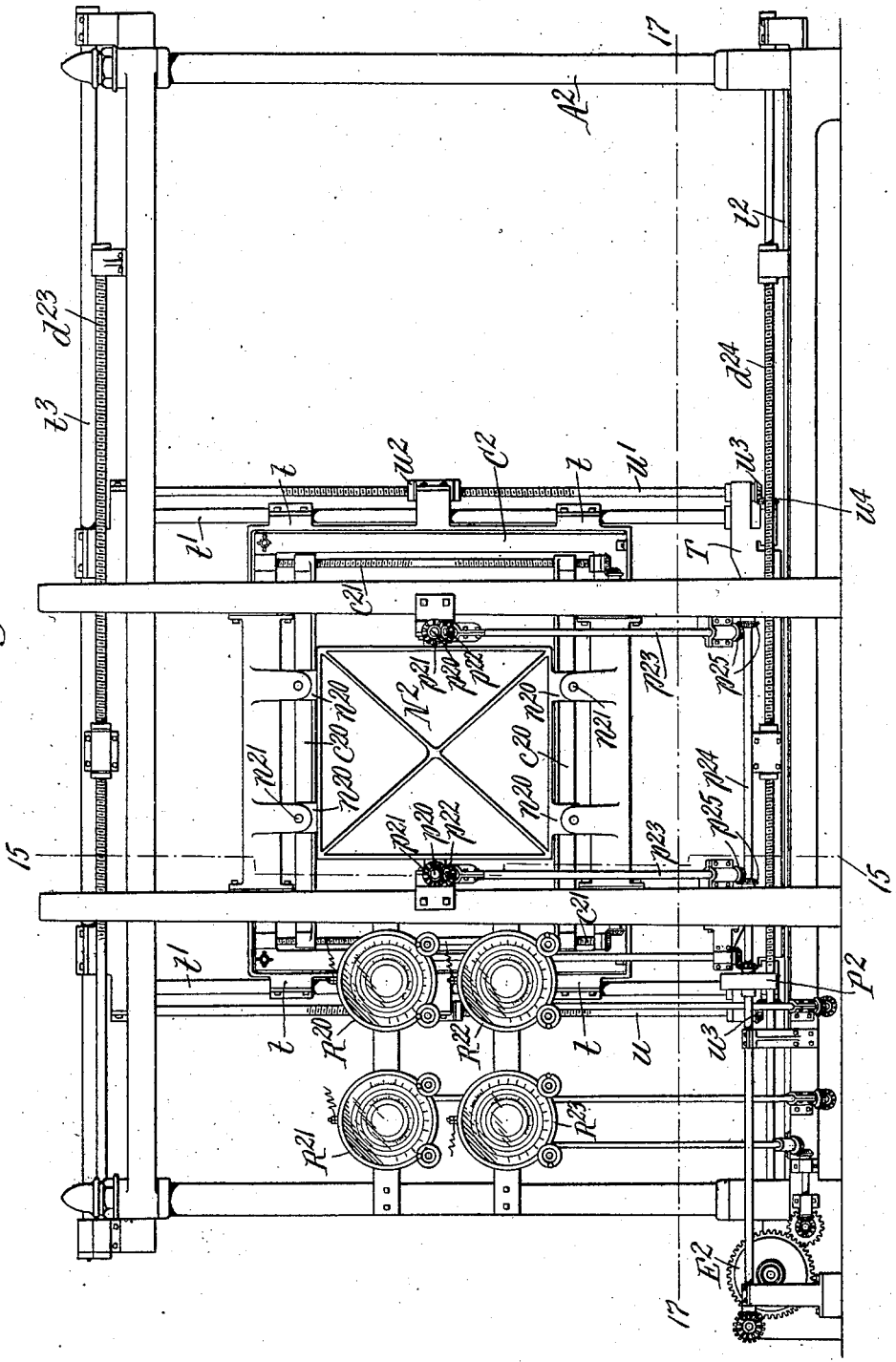

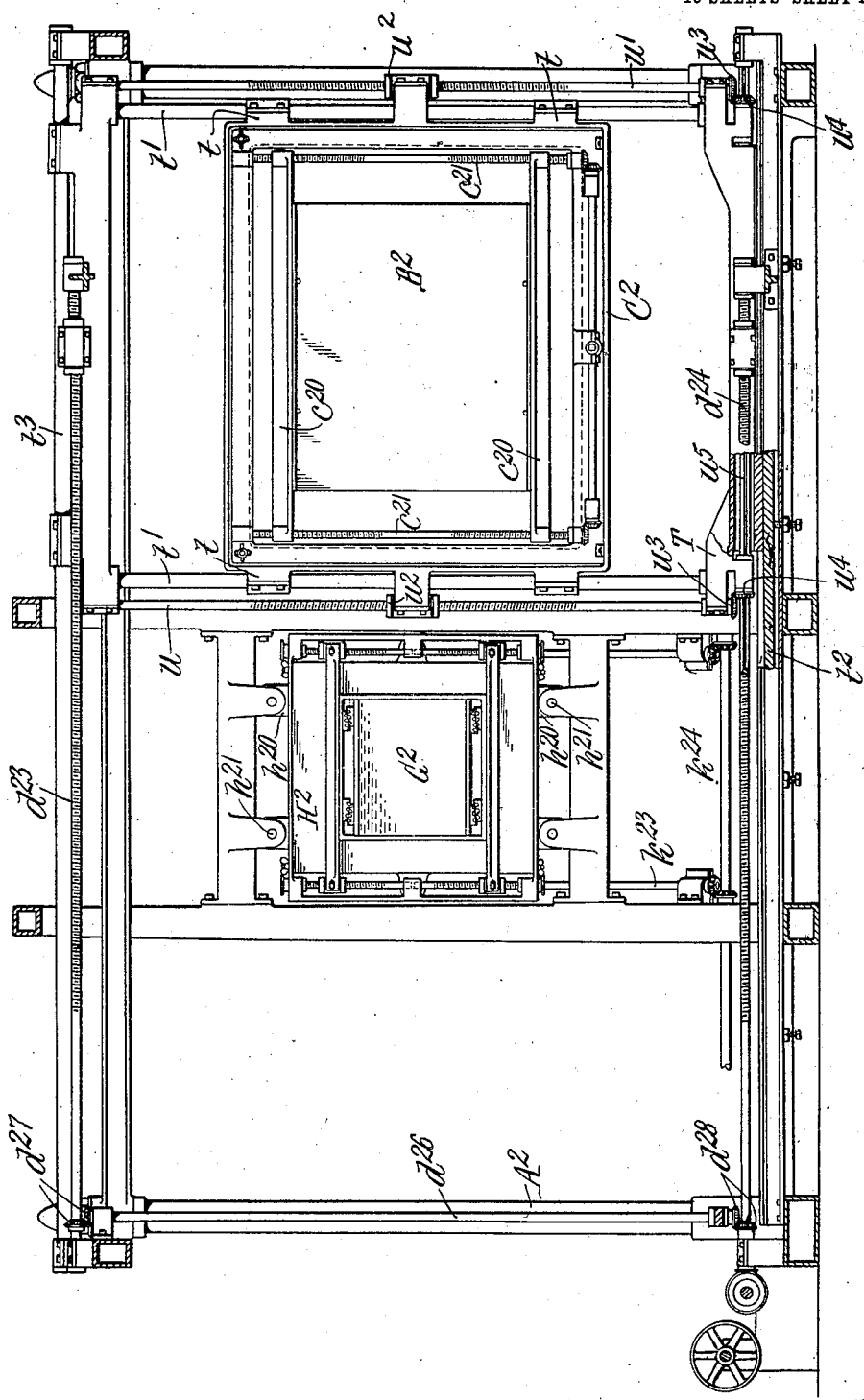

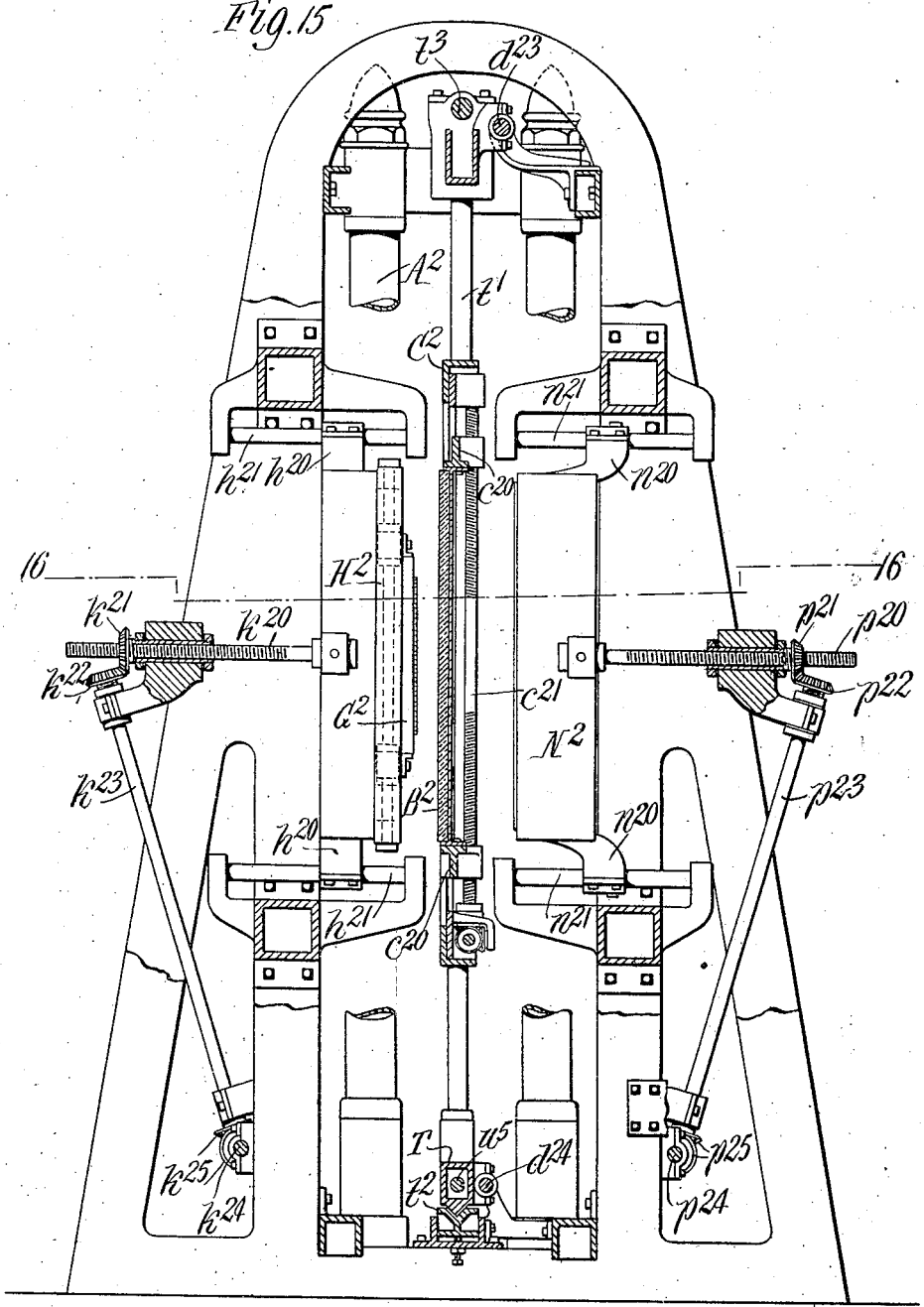

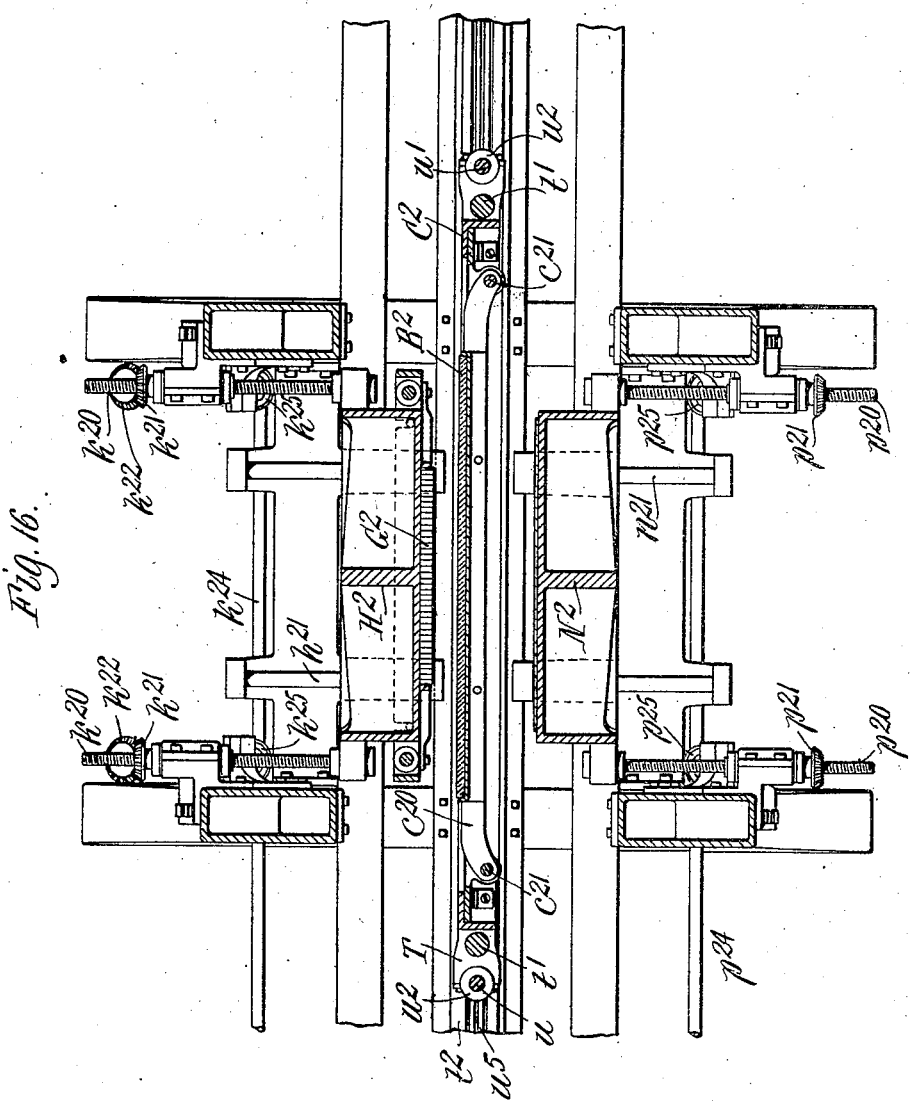

W. C. HUEBNER.
MACHINE FOR MAKING ELECTROTYPE MATRICES.
APPLICATION FILED APR. 7, 1911.
1,057,737.
Patented Apr. 1, 1913.
13 SHEETS—SHEET 13.
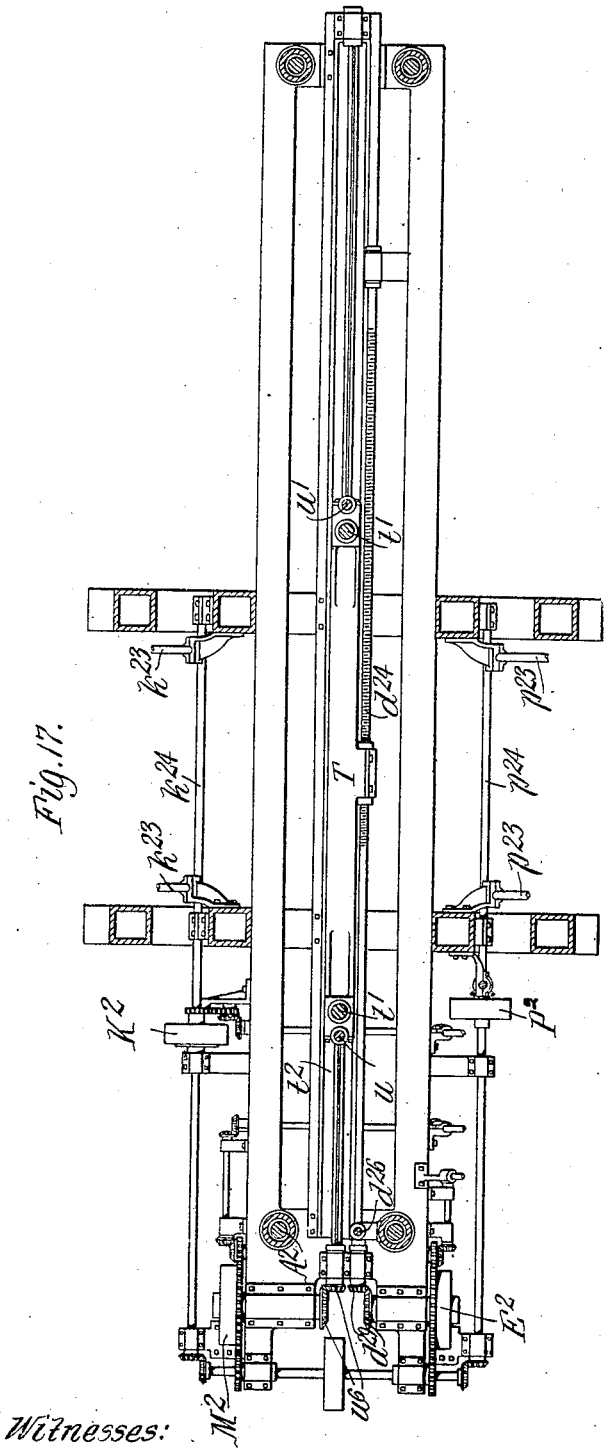
Witnesses:
Inventor.
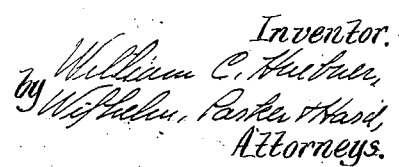
Attorneys.

UNITED STATES PATENT OFFICE.

WILLIAM C. HUEBNER, OF BUFFALO, NEW YORK, ASSIGNOR TO HUEBNER-BLEISTEIN PATENTS COMPANY, OF BUFFALO, NEW YORK.

MACHINE FOR MAKING ELECTROTYPE-MATRICES.

1,057,737. Specification of Letters Patent. Patented Apr. 1, 1913.

Application filed April 7, 1911. Serial No. 619,559.

*To all whom it may concern:*

Be it known that I, WILLIAM C. HUEBNER, a citizen of the United States, residing at Buffalo, in the county of Erie and State of New York, have invented a new and useful Improvement in Machines for Making Electrotype-Matrices, of which the following is a specification.

This invention relates to machines for producing the wax or plastic matrices or molds which are used for making electrotype printing plates.

The object of the invention is to produce an efficient, practical and desirable machine by which the matrices can be produced rapidly and accurately with the minimum amount of labor, and in which the holder for the matrix and that for the printing form are relatively adjustable in different directions in such a manner as to enable an impression to be made with great exactness in a predetermined position on the matrix plate, or a succession of duplicate or dissimilar impressions to be made exactly in any required location or arrangement on the matrix plate. For brevity of description, the printing form, which may be composed of type, pictorial blocks, engravings, and may be in relief or intaglio, is hereinafter termed the "form".

The relative adjustment of the matrix holder and the form holder necessary to enable the impressions to be made in any required positions or arrangements on the matrix plates can be effected in various different ways. For example, the matrix holder and the form holder can be adjusted in different directions, say the former horizontally and the latter vertically, in parallel planes; or the form holder can be adjusted both horizontally and vertically, or in other directions at an angle to each other, in a plane parallel with the face of the matrix; or the matrix holder can be adjusted both horizontally and vertically, or in other directions at an angle to each other, in a plane parallel with the face of the form. Three constructions embodying these different arrangements are illustrated in the accompanying drawings. In addition to the described relative adjustments of the matrix and form holders, one of these parts is arranged to move toward and from the other for making the impression, and a platen or back support is preferably arranged on the opposite side of the matrix plate from the form holder for rigidly supporting the matrix plate when the pressure is applied. In the constructions in which the form holder is adjustable for determining the position of the impression, means are provided for simultaneously and correspondingly adjusting the platen or back support so that it is maintained always directly opposite to the form holder.

The drawings represent three different machines which differ mainly in the manner in which the matrix, the form and the platen are made adjustable for producing the printing position. In the machine represented in Figures 1–6 the matrix holder is adjustable horizontally, while the form and the platen are adjustable vertically. In the machine represented in Figs. 7–12 the matrix holder is stationary and the form and the platen are each adjustable both horizontally and vertically. In the machine represented in Figs. 13–17 the matrix holder is adjustable both vertically and horizontally, while the form and the platen are not adjustable parallel with the plane of the platen.

Fig. 1 is a front elevation, partly in section, of a machine embodying the first-mentioned construction. Fig. 2 is a longitudinal sectional elevation thereof, the matrix being partly broken away to disclose the form. Fig. 3 is a transverse sectional elevation thereof, on an enlarged scale, in line 3—3, Fig. 1. Fig. 4 is a sectional plan thereof in line 4—4, Fig. 1. Fig. 5 is an enlarged section of the drive clutch of the adjusting mechanism for the matrix holder. Fig. 6 is an enlarged section of the drive clutch of the operating mechanism for the form holder. Figs. 7–10 are views, corresponding respectively to Figs. 1–4, of a machine embodying the second construction mentioned. Fig. 11 is an enlarged section of the drive clutch of the horizontal adjusting mechanism for the form holder and platen. Fig. 12 is an enlarged section of the drive clutch of the operating mechanism for the form holder. Fig. 13 is a front elevation of a machine embodying the third construction mentioned. Fig. 14 is a longitudinal sectional elevation thereof, showing a different position of the matrix holder. Fig. 15 is a transverse sectional elevation thereof, on an enlarged scale, in line 15—15, Fig. 13. Fig. 16 is a fragmentary sectional plan view in line 16—16, Fig. 15. Fig. 17 is a sectional plan view thereof in line 17—17, Fig 13. Figs. 18 and 19 are enlarged sections of the drive clutches of the adjusting mechanism for the matrix holder and the operating mechanism for the form holder, respectively.

Like reference characters refer to like parts in the several figures.

A represents the stationary main frame of the machine which may be of any suitable construction, the frame shown being of substantially rectangular form and comprising rectangular base and top parts $a$ and $a'$ connected by upright corner posts $a^2$ and by upright intermediate front and rear frames $a^3$ and $a^4$.

B represents the matrix plate, which, as usual, consists of a body of wax or other suitable plastic material backed by a metal plate or container $b$. This matrix plate, which, for brevity, will be hereinafter termed the matrix, is supported in an upright position in a holder or carriage C of any suitable construction which is adjustable horizontally lengthwise in the main frame A. As shown, the matrix holder consists of an upright rectangular frame provided with upper and lower adjustable bars $c$ and $c'$ between which the matrix is held. These holding bars are moved simultaneously toward and from each other for securing and releasing the matrix by vertical screws $c^2$ and $c^3$ which are journaled in the matrix holder C and have right and left-hand threads working in threaded holes in the opposite ends of the two holding bars. These screws are simultaneously rotated by a horizontal shaft $c^4$ journaled on the lower portion of the matrix holder and connected with the screws by bevel gears $c^5$ and $c^6$, and with an operating shaft $c^7$ by bevel gears $c^8$, Fig. 3. The operating shaft can be turned by a detached crank (not shown) applied thereto.

The matrix holder C is suitably mounted in the main frame to slide horizontally in a vertical plane parallel with the face of the matrix, for instance, the lower edge of the holder slides in a grooved track or guide rail $d$ on the base portion of the main frame, and guide lugs $d'$ on the top of the holder slide on a horizontal guide rod $d^2$ on the top portion of the main frame. The matrix holder C is adjusted horizontally on its guides by upper and lower horizontal adjusting screws $d^3$ and $d^4$ which are journaled on the main frame and work in threaded nuts or parts $d^5$ and $d^6$ on the upper and lower parts of the holder. The two adjusting screws are caused to turn together by a vertical shaft $d^7$ on one end of the main frame and connected with the adjusting screws by bevel gears $d^8$ and $d^9$, and the lower adjusting screw $d^4$ is connected at one end by bevel gears $d^{10}$ with the shaft $e$ or driven member of a clutch E having a loose or driving member connected, for instance, by gear wheels $e'$ and $e^2$ to a main drive shaft F. The driving member of the clutch is driven continuously and the adjusting screws are set in motion to move the matrix holder or stopped to arrest the movement of the holder by operating the clutch to couple its driven member with or disconnect it from the driving member. The matrix holder can be differently constructed and adjustably mounted to move parallel with the plane of the matrix, and other means operated by hand or power can be used for adjusting it. The holder for the form and the platen or back support are arranged facing each other on opposite sides of the matrix holder.

G represents the form, which is arranged facing the matrix on a holder or support H on which the chase or composing frame containing the form is secured by any suitable means, such, for instance, as adjustable clamping bars $g$ between which the chase is held. The holder H is suitably mounted to move toward and from the matrix holder for pressing the form into the matrix material to make the impression, and for removing the form, and also so as to be adjusted vertically relative to the matrix. As shown, the form holder, which is a metal plate with stiffening ribs or flanges, is arranged to move toward and from the matrix holder C on horizontal guides $h$ on a rectangular frame or carriage I, which, in turn, is adjustable vertically on the main frame. The carriage I is guided by grooved parts at its opposite sides which embrace and slide on vertical guide ribs $i$ at the opposite sides of the upright portion $a^4$ of the main frame.

The means shown for moving the form holder H horizontally comprise a screw $k$ secured thereto and working in an internally threaded gear wheel $k'$, Fig. 4, which is journaled on a cross bar $k^2$ of the carriage I and is driven by a gear wheel $k^3$ which is splined on a vertical shaft $k^4$ journaled on the upright portion $a^4$ of the main frame. This shaft $k^4$ is connected at its lower end by bevel gears $k^5$ to a horizontal shaft $k^6$ which is connected to the driven member of a clutch K, the other or driving member of which is connected to the drive shaft F, for instance, by a shaft $k^7$ and bevel gears $k^8$. This clutch can be of any suitable construction but is preferably adapted to be operated like the clutch E, to drive the adjusting mechanism for the form holder H or to stop the adjusting mechanism by closing or opening the clutch operating circuit.

The form holder carriage I is adjusted vertically conveniently by vertical screws $l\ l$ which are journaled on the upright frame portion $a^4$ and work in screw-threaded nuts or lugs $l'$ on the opposite sides of the carriage I. The adjusting screws $l\ l$ are caused to turn together by a horizontal shaft $l^2$ journaled on the lower portion of the main frame and connected to the screws by bevel gears. These bevel gears are not shown in the drawings but are arranged in the same manner as the corresponding gears of the adjusting mechanism for the platen or back support which are shown in Fig. 1 and hereinafter described. The shaft $l^2$ is connected by bevel gears $l^3$, Fig. 4, to the driven shaft or member of a clutch M, which is preferably similar in construction and operation to the clutch E, and the loose or driving member of which is similarly geared by wheels $m\ m^7$ to the drive shaft F. The form holder can be constructed and mounted in other ways and other means employed for adjusting it toward and from the matrix holder and vertically.

N represents the platen or back support, which is provided with a face pad or covering $n$ adapted to afford a suitable yielding backing for the matrix in making the impressions. The platen, like the form holder H, is preferably adjusted toward and from the matrix holder C in horizontal guides $o$ on a carriage O which is adjustable vertically. The carriage O is guided vertically on the upright front portion $a^3$ of the main frame. The adjusting screw $p$ for the platen is operated by an internally threaded gear wheel $p'$ which meshes with a gear wheel $p^2$ splined on a vertical shaft $p^4$. This shaft is connected by bevel gears $p^5$ to a horizontal shaft $p^6$ which is connected to the driven member of a clutch P which is preferably similar to the clutch K and is similarly connected to the drive shaft F by a shaft $p^7$ and bevel gears $p^8$.

The platen carriage O is adjusted vertically by vertical screws $q\ q'$ which are caused to turn together by a horizontal shaft $q^2$ connected by bevel gears $q^3$, Fig. 1, to the screws. This shaft $q^2$ is connected, for instance, by bevel gears $q^4$, a cross shaft $q^5$ and bevel gears $q^6$ to the horizontal shaft $l^2$ of the vertical adjusting mechanism for the form holder carriage I, whereby these two carriages I and O will be adjusted vertically simultaneously and to the same extent so that the form holder H and platen N will always be retained directly opposite to each other.

The clutches E, K, M and P form no part of the present invention and clutches of any known or suitable construction can be used, but electrical clutches are preferably employed which are adapted to be operated to drive the adjusting mechanisms connected therewith and to stop the same by opening and closing the clutch operating circuits. Each clutch is preferably controlled by a micrometer controlling device which is adapted to be set to obtain any predetermined adjustment of a part operated by the clutch and which operates automatically to throw the clutch out of action and stop the movement of said part when it arrives at the predetermined position.

R $R'$ $R^2$ $R^3$ represent the controlling devices for the clutches E K M and P, respectively. These controlling devices are constructed and operate as disclosed in a copending application and as they are not claimed in this application they are not herein described.

This invention, in its broader aspects, is concerned with the arrangement of the matrix holder C, form holder H and platen N so that they can be adjusted horizontally and vertically relative to each other, parallel with the face of the matrix, and so that the form holder and platen can be moved toward and from the matrix, rather than with the particular construction, manner of mounting and the particular mechanisms for adjusting these devices, and the invention is not limited to the described construction and other suitable constructions for the purpose can be employed, examples of which are hereinafter described.

In the second construction of the machine, shown in Figs. 7–12, the form holder and platen are arranged on opposite sides of the matrix holder and are movable horizontally toward and from the latter for making the impressions, as in the construction above described, but the matrix holder is stationary and the form holder and platen are adjustable both horizontally and vertically in vertical planes parallel with the matrix to enable the impressions to be made in any required position on the matrix. $A'$ represents the main frame, $B'$ the matrix, $C'$ the matrix holder, $G'$ the form, $H'$ the form holder, $I'$ the carriage therefor, $N'$ the platen or back support, and $O'$ the carriage therefor. The matrix holder $C'$ is stationarily secured in the main frame in any suitable way and preferably extends from end to end thereof. The holder is provided with bars $c^{10}$ between which the matrix is held and which are moved by screws $c^{11}$ which are operated as before described. This construction is especially suited for making large matrices. The carriages $I'$ and $O'$ for the form holder and the platen, instead of being vertically adjustable on stationary guide frames, as before described, are guided vertically on upright carrier frames S $S'$ which are arranged to slide horizontally lengthwise on the main frame. These carrier frames are preferably rigidly connected by top and bottom cross pieces $s\ s'$ and are guided by guides $s^2\ s^3$ at the top and bottom portions of the main frame, see Fig. 9. The carrier frames S S' are adjusted, for instance, by upper and lower screws $s^4$ $s^4$ which work in threaded nuts or parts $s^5$ on the cross pieces connecting the frames, whereby the frames are adjusted together. The adjusting screws are caused to turn together by a vertical shaft $s^6$, Fig. 8, connected to the screws by bevel gears $s^7$ $s^8$, and the lower screw is connected by bevel gears $s^9$ to a driving electrical clutch E' corresponding to the clutch E. The form holder H' and platen N' are moved horizontally on their carriages toward and from the matrix, preferably by screw adjusting mechanisms similar to the adjusting mechanisms for the corresponding parts in the first construction. As, however, the form holder and platen are mounted on the horizontally adjustable carrier frames S S', the vertical operating shaft $p^{10}$ for the platen adjusting screw $p^{11}$ is connected by a bevel gear $p^{12}$ to a bevel gear $p^{13}$, Fig. 7, which is journaled on the carrier frame S' and is splined on the horizontal shaft $p^{10}$ so that the platen can be operated in any position of the carrier frame. The shaft $p^{16}$ is driven by an electrical clutch P' corresponding to the clutch P. The vertical operating shaft $k^{10}$ for the adjusting screw $k^{11}$ of the form holder is similarly connected by bevel gears to the horizontal shaft $k^{16}$ which is driven by an electrical clutch K' corresponding to the clutch K.

The mechanism for simultaneously adjusting the form holder and platen carriages I' and O' vertically on the carrier frames S S' is substantially the same as the corresponding mechanism employed in the first construction, except for the change necessary to permit of the horizontal movement of the carrier frames. The vertical adjusting screws $q^{10}$ $q^{10}$ of the platen carriage O' are connected by bevel gears $q^{11}$ $q^{13}$, Fig. 7, to a horizontal shaft $q^{12}$. The bevel gears $q^{13}$ are journaled on the carrier frame S' and splined on the shaft $q^{12}$, which enables the operation of the adjusting mechanism in any position of the carrier frame. The vertical adjusting screws $l^{10}$ $l^{10}$ of the form holder carriage are similarly connected to the horizontal shaft $l^{21}$. This shaft $l^{12}$ is connected by bevel gears $l^{13}$, Fig. 10, to the driven member of an electrical clutch M' corresponding to the clutch M, and the shaft $l^{12}$ is connected by bevel gears $q^{14}$, a cross shaft $q^{15}$ and bevel gears $q^{16}$ to the shaft $q^{12}$, whereby the two carriages I' and O' are adjusted vertically simultaneously and to the same extent. The driving clutches for the several adjusting mechanisms in this construction, as in the first construction, are preferably electrical clutches controlled by the automatic stop or controlling devices $R^{10}$ $R^{11}$ $R^{12}$ $R^{13}$ in the manner before described.

In the third construction of the machine, shown in Figs. 13–19, $A^2$ represents the main frame, which is similar to the main frame in the first construction. $B^2$ represents the matrix, $C^2$ the matrix holder, $G^2$ the form, $H^2$ the form holder, and $N^2$ the platen or back support. The form holder and platen are arranged on opposite sides of the matrix holder and are movable toward and from the latter for making the impressions, but instead of adjusting the form holder and platen parallel with the matrix either horizontally or vertically, the matrix holder is mounted so that it can be adjusted both horizontally and vertically for locating the impressions in the required positions on the matrix. The matrix holder $C^2$, which is provided with holding bars $c^{20}$ for the matrix operated by screws $c^{21}$ in the manner explained, is adjustable vertically in a rectangular upright frame or carriage T which in turn is adjustable horizontally lengthwise in the main frame. The matrix holder shown has guide lugs $t$ at its opposite sides which embrace and slide on the vertical side rods $t'$ of the carriage. The lower edge of the carriage slides in a grooved guide rail $t^2$ on the base of the main frame and the guide lugs at the top of the carriage embrace and slide on a horizontal rod $t^3$ at the upper portion of the main frame. The carriage T is preferably adjusted horizontally, like the matrix holder in the first construction, by upper and lower adjusting screws $d^{23}$ and $d^{24}$. These screws are caused to turn together by a vertical shaft $d^{26}$ connected by bevel gears $d^{27}$ $d^{28}$ with the screws, and the lower adjusting screw $d^{24}$ is connected by bevel gears $d^{29}$ with the driven member of a clutch $E^2$ corresponding to the clutch E. The matrix holder is adjusted vertically in the carriage T by two vertical screws $u$ $u'$ which are journaled in the carriage and work in threaded nuts or parts $u^2$ on the opposite sides of the matrix holder. The adjusting screws are connected by bevel gears $u^3$ $u^4$ to a horizontal shaft $u^5$ by which they are caused to turn together. The bevel gears $u^4$ are journaled in bearings on the carriage and are splined on the shaft $u^5$, so that the screws can be operated in any position of the carriage. This shaft $u^5$ is journaled on the lower portion of the main frame and is connected by bevel gears $u^6$ to the driven member of a clutch $M^2$ corresponding to the clutch M in the first construction. The platen or back support $N^2$ shown is guided in its movement toward and from the matrix holder by guide lugs $n^{20}$ at its top and bottom which embrace and slide on horizontal guide rods $n^{21}$ fixed on the upright front portion of the main frame, and is moved by two adjusting screws $p^{20}$ working in internally threaded bevel gears $p^{21}$. These bevel gears are journaled in bearings on the main frame and mesh with bevel gears $p^{22}$ on inclined shafts $p^{23}$ which are connected by bevel gears $p^{25}$ with a horizontal shaft $p^{24}$. This shaft is connected to the driven member of a clutch $P^2$ corresponding to the clutch P in the first construction. The form holder $H^2$ is similarly guided in its movements toward and from the matrix holder by guide lugs $h^{20}$ which slide on horizontal guide rods $h^{21}$, and is moved by two adjusting screws $k^{20}$ working in internally threaded bevel gears $k^{21}$ which are connected by bevel gears $k^{22}$, inclined shafts $k^{23}$ and bevel gears $k^{25}$ to a horizontal shaft $k^{24}$. This shaft is connected to the driven member of a clutch $K^2$ corresponding to the clutch K in the first construction. $R^{20}$ $R^{21}$ $R^{22}$ $R^{23}$ represent the micrometer controlling or stop devices by which the clutches of the several adjusting mechanisms are automatically controlled, as in the first construction.

In the use of the machine, the matrix and the printing form are secured in place in their respective holders. The form holder or the matrix holder, or both, depending upon which of the described constructions of the machine is employed, is or are then adjusted in one or both directions parallel with the matrix as may be necessary for making the impressions at the required place in the matrix. In the constructions in which the form holder is adjusted, the platen is adjusted simultaneously therewith, as explained. Then the platen is adjusted to bear against and support the matrix, and the form holder is moved toward the matrix holder to make the impression, after which the form holder and the platen are withdrawn from the matrix and a new form and matrix can be put in place and the operation repeated. If a plurality of duplicate impressions are to be made on the same matrix, the matrix holder or the form holder and platen, or the three parts are adjusted for the required location of the next impression and the impression is made as before. A plurality of varied forms or blocks can also be placed upon the form holder and assembled in a desired arrangement on the matrix.

I claim as my invention:

1. The combination of a matrix holder, a form holder movable toward and from the face of the matrix for making the impression, a platen movable toward and from the rear side of the matrix for supporting the same against the pressure of the form, and means for producing a relative adjustment of the matrix holder, the form holder and the platen parallel with the plane of the matrix for placing the parts in the printing position, substantially as set forth.

2. The combination of a stationary main frame, a matrix holder supported in the same, a form holder supported in the main frame opposite the face side of the matrix and movable toward and from the same, a platen supported in the main frame opposite the rear side of the matrix and movable toward and from the same, and means for producing a relative adjustment of the matrix holder, the form holder and the platen in the main frame parallel with the plane of the matrix for placing the parts in the printing position, substantially as set forth.

3. The combination of a stationary main frame, a matrix holder adjustable therein parallel with the plane of the matrix and in two directions at right angles to each other, a form holder supported in the main frame opposite the face side of the matrix and movable toward and from the same, and a platen supported in the main frame opposite the rear side of the matrix and movable toward and from the same, substantially as set forth.

4. In a machine for making matrices, the combination with a form holder, a platen, and a matrix holder arranged between said form holder and said platen, means for adjusting the platen toward the matrix holder, means for moving one of said holders toward and from the other to make the impressions and separate the parts, and means for producing a relative adjustment between the matrix holder and the form holder and platen in a plane parallel with the plane of the matrix, substantially as set forth.

5. In a machine for making matrices, the combination with a form holder, a platen, and a matrix holder arranged between said form holder and said platen, means for moving the form holder and the platen independently toward and from the matrix holder to make the impressions and separate the parts, and means for producing a relative adjustment between the matrix holder and the form holder and platen in a plane parallel with the plane of the matrix, substantially as set forth.

6. The combination of a matrix holder, a form holder arranged opposite the face side of the matrix holder, mechanism for moving one of said parts toward and from the other for making the impression, means for producing a relative adjustment of said matrix holder and form holder parallel with the face of the matrix, a drive shaft, and clutches which independently control the connection of said drive shaft with said impression mechanism and said adjusting means, substantially as set forth.

7. The combination of a matrix holder, a form holder arranged opposite the face side of the matrix holder, mechanism for moving the form holder toward and from the matrix holder, means for producing a relative adjustment of the matrix holder and the form holder parallel with the plane of the matrix, a drive shaft, and clutches which independently control the connection of said drive shaft with the mechanism for moving the form holder and said adjusting means, substantially as set forth.

8. The combination of a matrix holder, a form holder arranged opposite the face side of the matrix holder, mechanism for moving the form holder toward and from the matrix holder, a platen arranged opposite the rear side of the matrix holder, mechanism for moving the platen toward and from the matrix holder, means for producing a relative adjustment of the matrix holder, the form holder and the platen parallel with the plane of the matrix, a drive shaft, and clutches which independently control the connection of the drive shaft with the mechanism for moving the form holder, the mechanism for moving the platen, and said adjusting means, substantially as set forth.

Witness my hand, this 30th day of March, 1911.

WILLIAM C. HUEBNER.

Witnesses:
C. W. PARKER,
C. B. HORNBECK.